(12) United States Patent
Wright

(10) Patent No.: US 9,277,729 B1
(45) Date of Patent: Mar. 8, 2016

(54) AUTOMATED PET CAGE

(71) Applicant: James Wright, Tampa, FL (US)

(72) Inventor: James Wright, Tampa, FL (US)

( * ) Notice: Subject to any disclaimer, the term of this patent is extended or adjusted under 35 U.S.C. 154(b) by 360 days.

(21) Appl. No.: 14/054,177

(22) Filed: Oct. 15, 2013

(51) Int. Cl.
 *G08B 23/00* (2006.01)
 *A01K 1/03* (2006.01)

(52) U.S. Cl.
 CPC .................................... *A01K 1/03* (2013.01)

(58) Field of Classification Search
 None
 See application file for complete search history.

(56) References Cited

U.S. PATENT DOCUMENTS

| | | | | |
|---|---|---|---|---|
| 3,860,995 | A * | 1/1975 | Lautenschlager, Jr. | ... E05D 3/16 16/332 |
| 4,001,973 | A * | 1/1977 | Rice | ...... F24C 15/023 126/191 |
| 4,995,658 | A * | 2/1991 | Shiraki | ............... E05B 47/0012 292/201 |
| 5,177,900 | A | 1/1993 | Solowiej | |
| 5,813,364 | A | 9/1998 | Harrison | |
| 5,992,096 | A * | 11/1999 | De La Cerda | ............ E05F 15/76 160/180 |
| 6,297,739 | B1 | 10/2001 | Small | |
| 6,318,296 | B1 | 11/2001 | Nguyen | |
| 6,710,714 | B2 * | 3/2004 | Conway | .................. A01K 1/033 119/712 |
| 7,393,023 | B1 * | 7/2008 | Kelly | .................... A01K 1/0017 292/144 |
| 7,564,362 | B2 * | 7/2009 | Cole | ......................... E06B 7/32 340/506 |
| 2005/0252622 | A1 * | 11/2005 | Reid | ......................... E06B 7/32 160/180 |
| 2007/0222621 | A1 * | 9/2007 | Cole | ......................... E06B 7/32 340/573.1 |
| 2007/0256643 | A1 * | 11/2007 | Coiro | ..................... A01K 1/031 119/457 |
| 2009/0217718 | A1 * | 9/2009 | Porter | ................. E05B 47/0002 70/271 |
| 2013/0068172 | A1 * | 3/2013 | Hoegh | ................. A01K 1/0017 119/481 |
| 2014/0033773 | A1 * | 2/2014 | Myers | ..................... E05B 15/02 70/129 |
| 2015/0068466 | A1 * | 3/2015 | Piccioni | .............. E04B 1/34363 119/448 |

* cited by examiner

*Primary Examiner* — Julie Lieu

(57) ABSTRACT

The automated pet cage includes a locking assembly for the door of the pet case, which is able to remotely or autonomously unlock and open the door of the pet cage as needed or in an emergency. The locking assembly is integrated into the design of the door of the pet cage, and provides for manual or autonomous operation in order to open the pet cage in a plurality of situations. The locking assembly is in communication with a display console that is in control over operation of the automated pet cage. The display console can remotely interface with a cellular telephone/Bluetooth enabled device in order to receive remote instructions in order to open the door of the pet cage. The display console also communicates wirelessly with the locking assembly.

9 Claims, 4 Drawing Sheets

AUTOMATED PET CAGE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of pet crates or cages, more specifically, a pet cage that has a door that opens automatically.

SUMMARY OF THE INVENTION

An embodiment of the disclosure meets the needs presented above by generally comprising an automated pet cage that includes a locking assembly for the door of the pet case, which is able to remotely or autonomously unlock and open the door of the pet cage as needed or in an emergency. The locking assembly is integrated into the design of the door of the pet cage, and provides for manual or autonomous operation in order to open the pet cage in a plurality of situations. The locking assembly is in communication with a display console that is in control over operation of the automated pet cage. The display console can device in order to receive remote instructions in order to open the door of the pet cage. The display console also communicates wirelessly with the locking assembly.

An object of the invention is to provide a pet cage that is able to open the door of the pet cage remotely in order to enable a pet to exit the pet cage.

Another object of the invention is for the automated pet cage to communicate remotely with a home security system, a cell phone, a Bluetooth enabled device.

Another object of the invention is for the console to include a CO2/smoke detector to operate the locking assembly in the event of detection of either CO2 gas or smoke.

Another object of the invention is for the console to be either affixed to the pet cage or not affixed.

Another object of the invention is for the door to include spring-loaded hinges such that upon unlocking of the locking assembly, the door opens via the spring-loaded hinges.

These together with additional objects, features and advantages of the automated pet cage will be readily apparent to those of ordinary skill in the art upon reading the following detailed description of presently preferred, but nonetheless illustrative, embodiments of the automated pet cage when taken in conjunction with the accompanying drawings.

In this respect, before explaining the current embodiments of the automated pet cage in detail, it is to be understood that the automated pet cage is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated pet cage.

It is therefore important that the claims be regarded as including such equivalent construction insofar as they do not depart from the spirit and scope of the automated pet cage. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
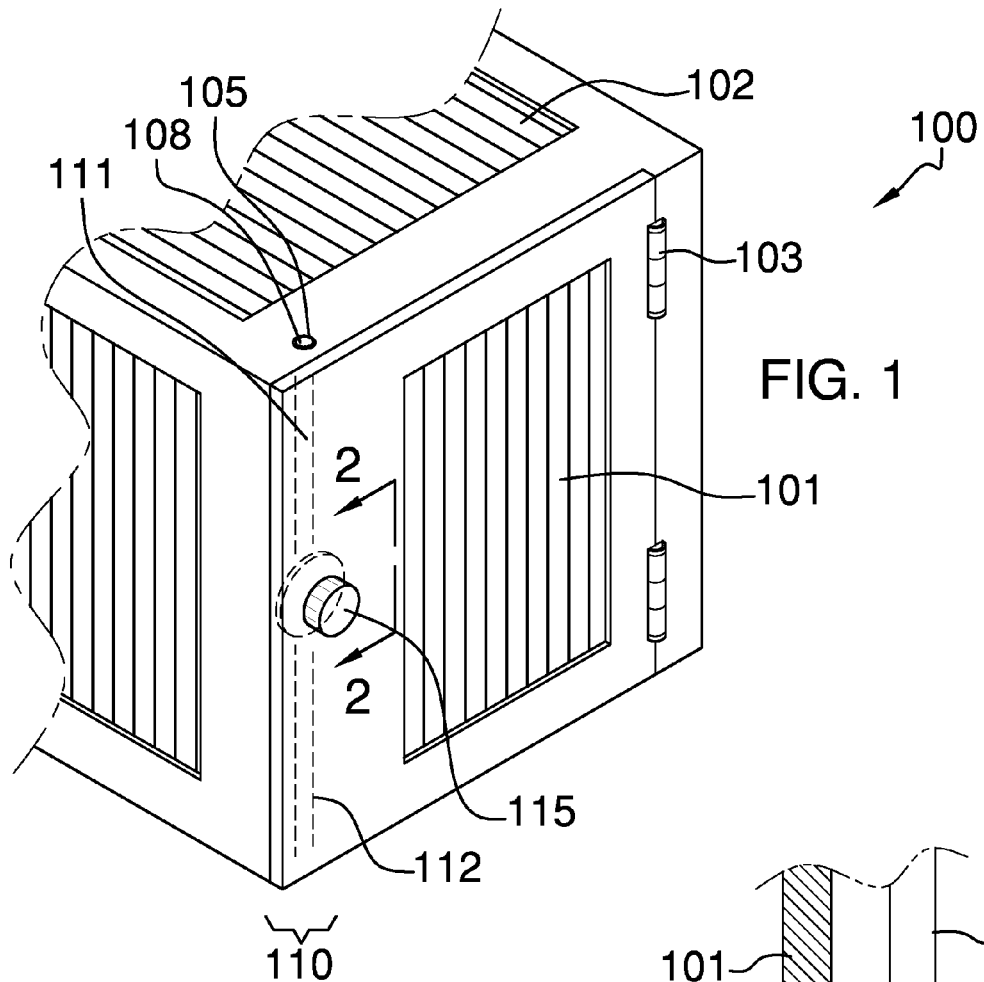
FIG. 1 is a front, perspective view of the automated pet cage.
Figure 2:
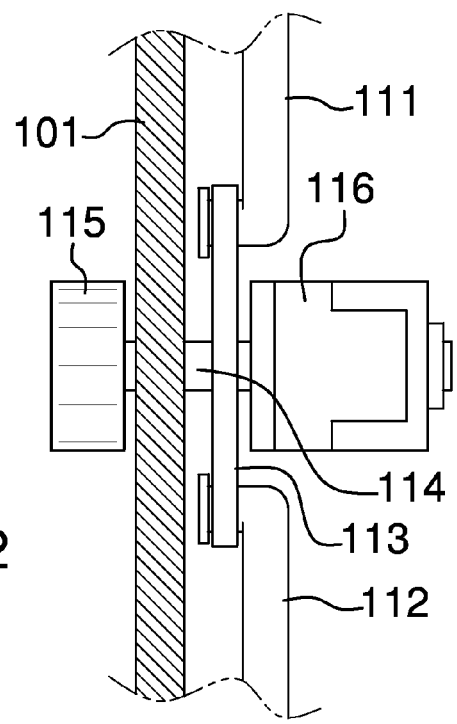
FIG. 2 is a cross-sectional view of the automated pet cage along line 2-2 in FIG. 1.
Figure 3:
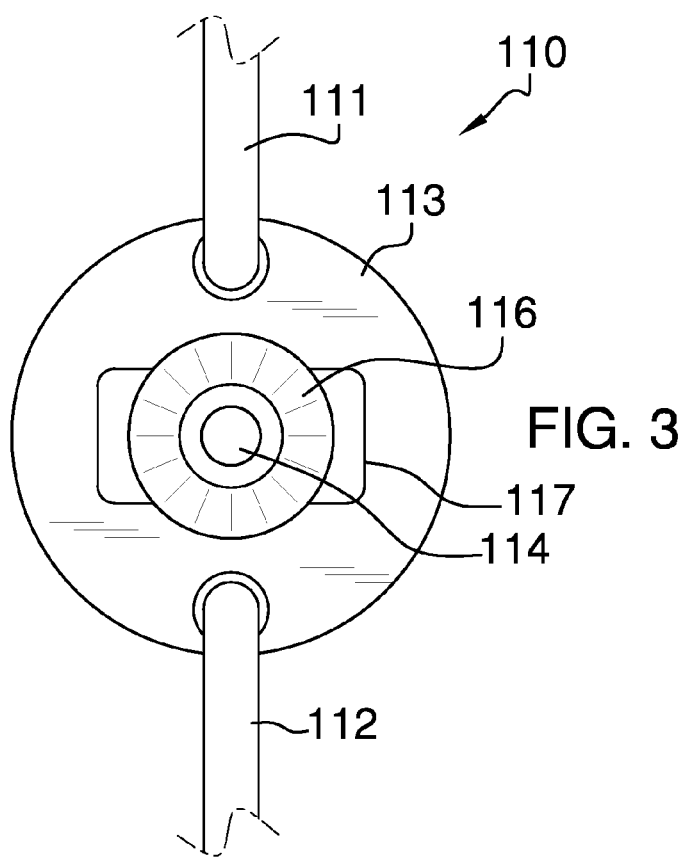
FIG. 3 is a detailed view of the locking assembly.
Figure 4:
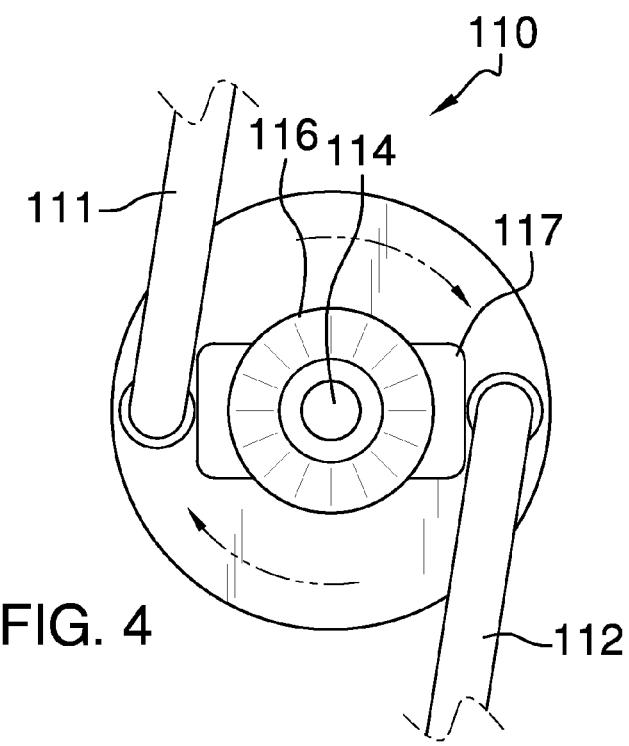
FIG. 4 is another detailed view of the locking assembly rotating to unlock the door of the pet cage via the motor.
Figure 5:
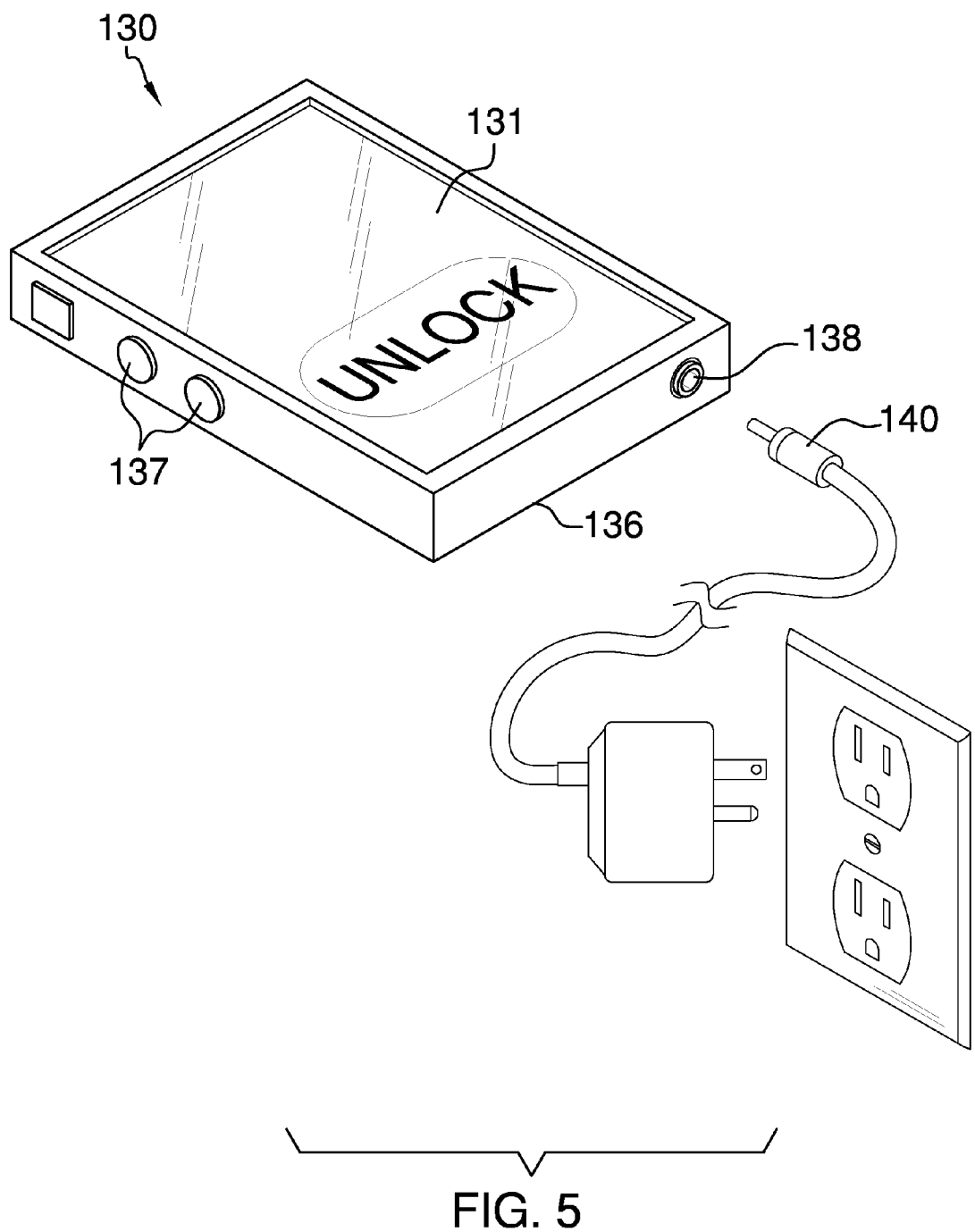
FIG. 5 is a perspective view of the display console that controls operation of the locking assembly.
Figure 6:
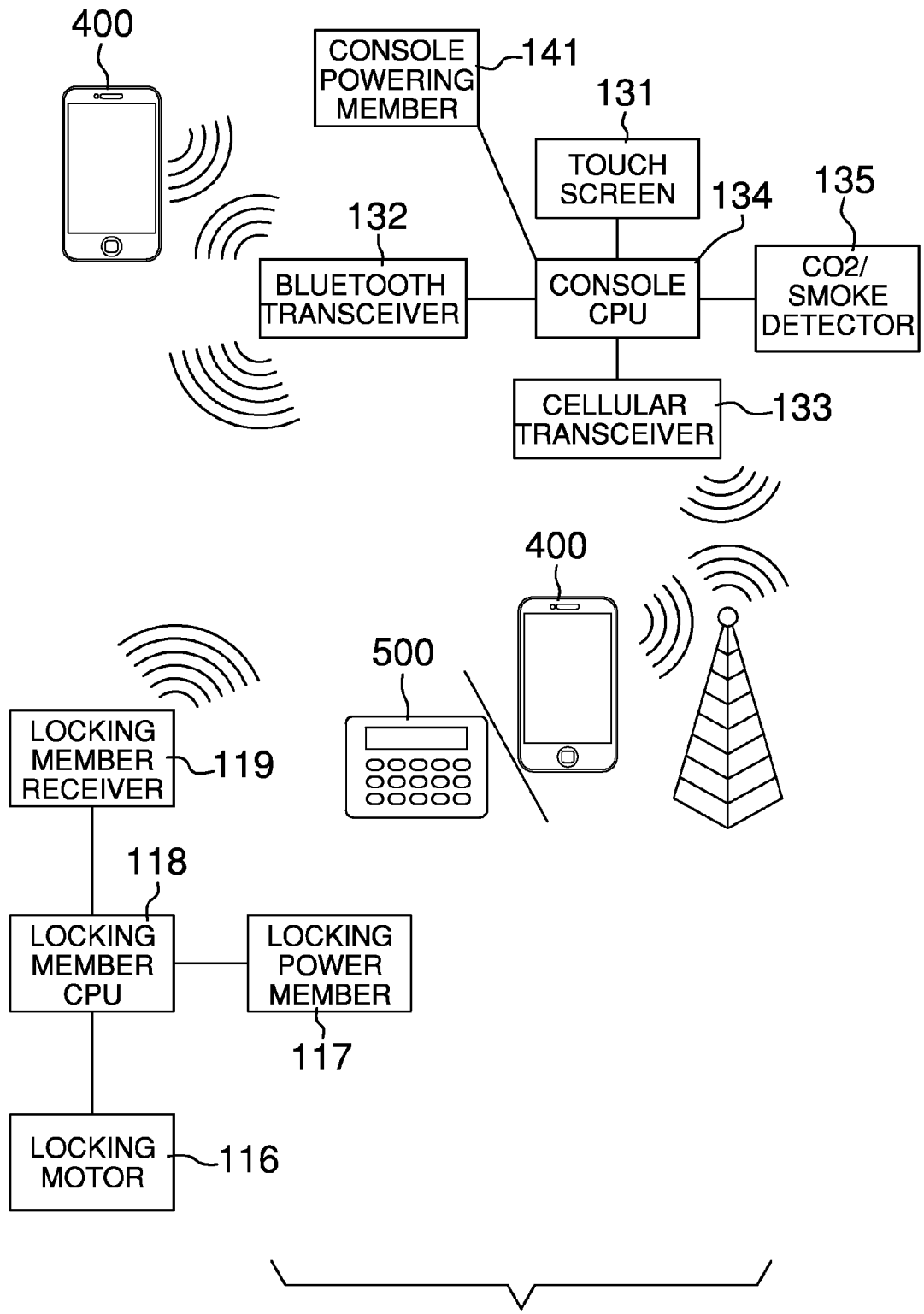
FIG. 6 is a block diagram of the componentry associated with the automated pet cage.

As best illustrated in FIGS. 1 through 6, the automated pet cage 100 (hereinafter invention) is further comprised of a door 101 attached to a cage 102 via at least one spring-loaded hinge 103. The door 101 locks in a closed state or unlocks and opens with respect to the cage 102 via a locking assembly 110.

The locking assembly 110 is further defined with a first locking armature 111 and a second locking armature 112. The first locking armature 111 extends upwardly whereas the second locking armature 112 extends downwardly. Both the first locking armature 111 and the second locking armature 112 are raised and lowered via a rotating member 113. The rotating member 113 pivots with respect to a central pivot point 114. Rotational movement of the rotating member 113 is accomplished either through manual rotation via a knob 115 or via a locking motor 116. The first locking armature 111 and the second locking armature 112 extend and lower to engage or disengage a distal end 108 with respect to armature holes 105 provided on the cage 102, which in effect locks or unlocks the door 101 with respect to the cage 102, respectively.

The locking motor 116 is powered via a locking powering member 117. Electrical power from the locking powering member 117 to the locking motor 116 is controlled via a locking member central processing unit 118. The locking member central processing unit 118 is in wired communication with a locking member receiver 119, which communicates with a console 130. The locking powering member 117 is comprised of at least one battery, which may be rechargeable.

The console 130 is a component of the invention 100, which is able to communicate wirelessly with the locking assembly 110. The console 130 includes a touch screen 131, a Bluetooth transceiver 132, a cellular transceiver 133, a console central processing unit 134, and a CO2/smoke detector 135. The console 130 includes a housing 136, which may be affixed to the cage 102 or door 101 directly. Alternatively, the housing 136 of the console 130 may be not affixed to the cage 102 or the door 101 in order for the console 130 to be hand-held. The housing 136 includes the touch screen 131 thereon as well as an on/off button 137, and a plug port 138. The plug port 138 enables an electrical cord 140 to plug into and recharge a console-powering member 141. The console-powering member 141 includes at least one battery, which may be rechargeable. The console-powering member 141 is in wired communication with the console central processing unit 134.

The Bluetooth transceiver 132 of the console 130 enables a cell phone 400 to communicate with the invention 100. Moreover, the cellular transceiver 135 of the console 130 enables the cell phone 400 or a home security system 500 to communicate with the invention 100. The cellular transceiver 135 shall work in the event the cell phone 400 is out of range of use with the Bluetooth transceiver 132. The cellular transceiver 135 communicates directly with a cell phone tower 600 in order to facilitate communication with the cell phone 400 or the home security system 500.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automated pet cage comprising:
a pet cage with a door attached via at least one spring-loaded hinge, which shall open said door upon unlocking of a locking assembly;
said locking assembly can communicate wirelessly with a console in order to operate autonomously or via a knob that manually operates said locking assembly;
wherein said console is adapted to communicate with a cell phone or a home security system;
wherein the locking assembly is further defined with a first locking armature and a second locking armature; wherein the first locking armature extends upwardly whereas the second locking armature extends downwardly; wherein both the first locking armature and the second locking armature are raised and lowered via a rotating member; wherein the rotating member pivots with respect to a central pivot point;
wherein rotational movement of the rotating member is accomplished either through manual rotation of the knob or via a locking motor.

2. The automated pet cage according to claim 1 wherein the first locking armature and the second locking armature extend and lower to engage or disengage a distal end with respect to armature holes provided on the cage, which locks or unlocks the door with respect to the cage, respectively.

3. The automated pet cage according to claim 2 wherein the locking motor is powered via a locking powering member; wherein electrical power from the locking powering member to the locking motor is controlled via a locking member central processing unit; wherein the locking member central processing unit is in wired communication with a locking member receiver, which communicates with the console.

4. The automated pet cage according to claim 3 wherein the locking powering member is comprised of at least one battery.

5. The automated pet cage according to claim 4 wherein the console includes a touch screen, a Bluetooth transceiver, a cellular transceiver, a console central processing unit, and a CO2/smoke detector.

6. The automated pet cage according to claim 5 wherein the console includes a housing, which is affixed to the cage or door directly, or alternatively the housing of the console is not affixed to the cage or the door.

7. The automated pet cage according to claim 6 wherein the housing includes the touch screen thereon as well as an on/off button, and a plug port; wherein the plug port enables an electrical cord to plug into and recharge a console-powering member; wherein the console-powering member includes at least one battery.

8. The automated pet cage according to claim 7 wherein the console-powering member is in wired communication with the console central processing unit.

9. The automated pet cage according to claim 8 wherein the CO2/smoke detector communicates with the locking member central processing unit to operate the locking assembly directly.

* * * * *